July 3, 1962  A. ROSELL  3,042,078
VOLUME FLOW REGULATING DEVICE
Filed March 6, 1959  3 Sheets-Sheet 1

Inventor:
Axel Rosell
by Howson & Howson
Attys.

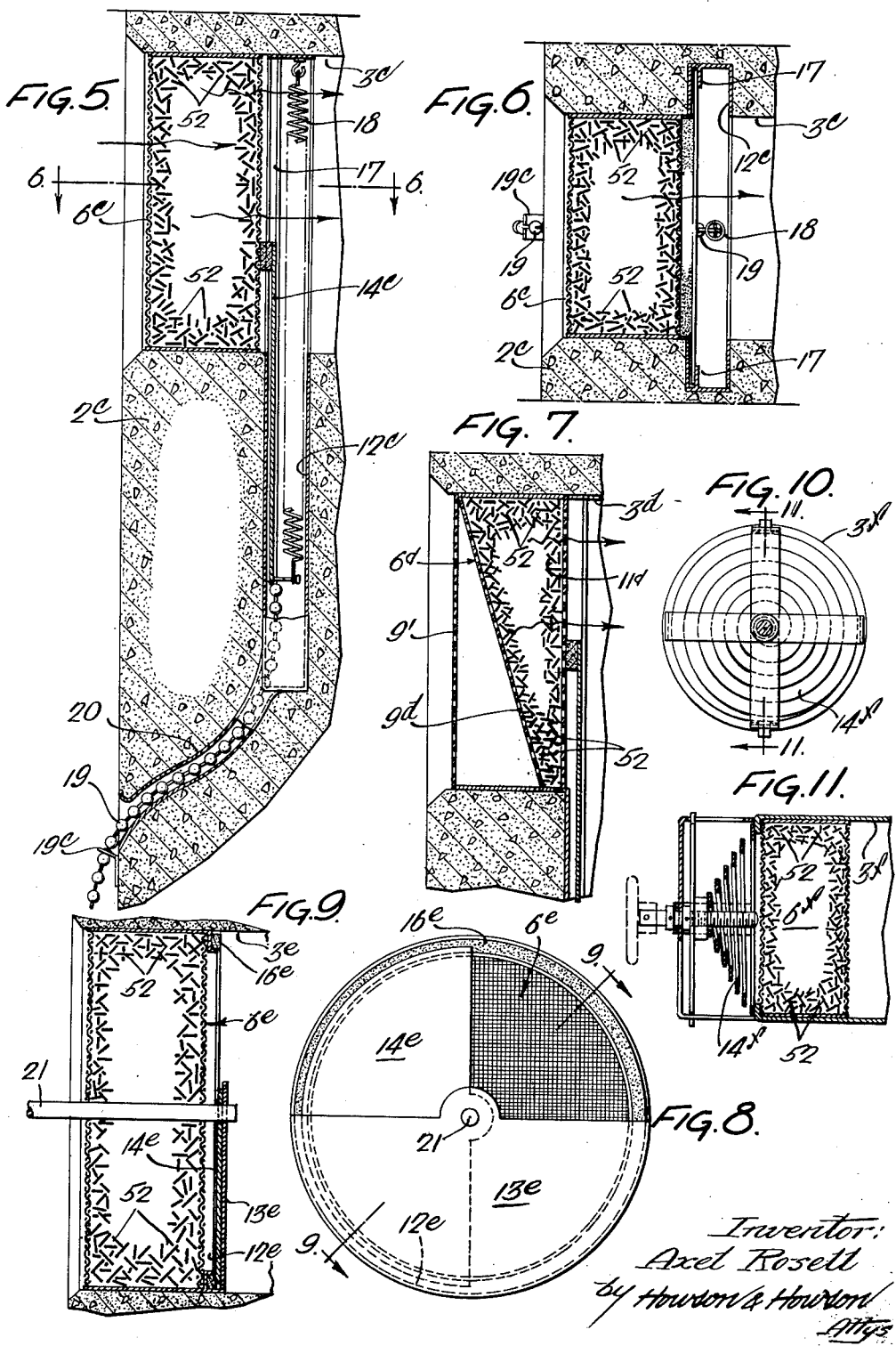

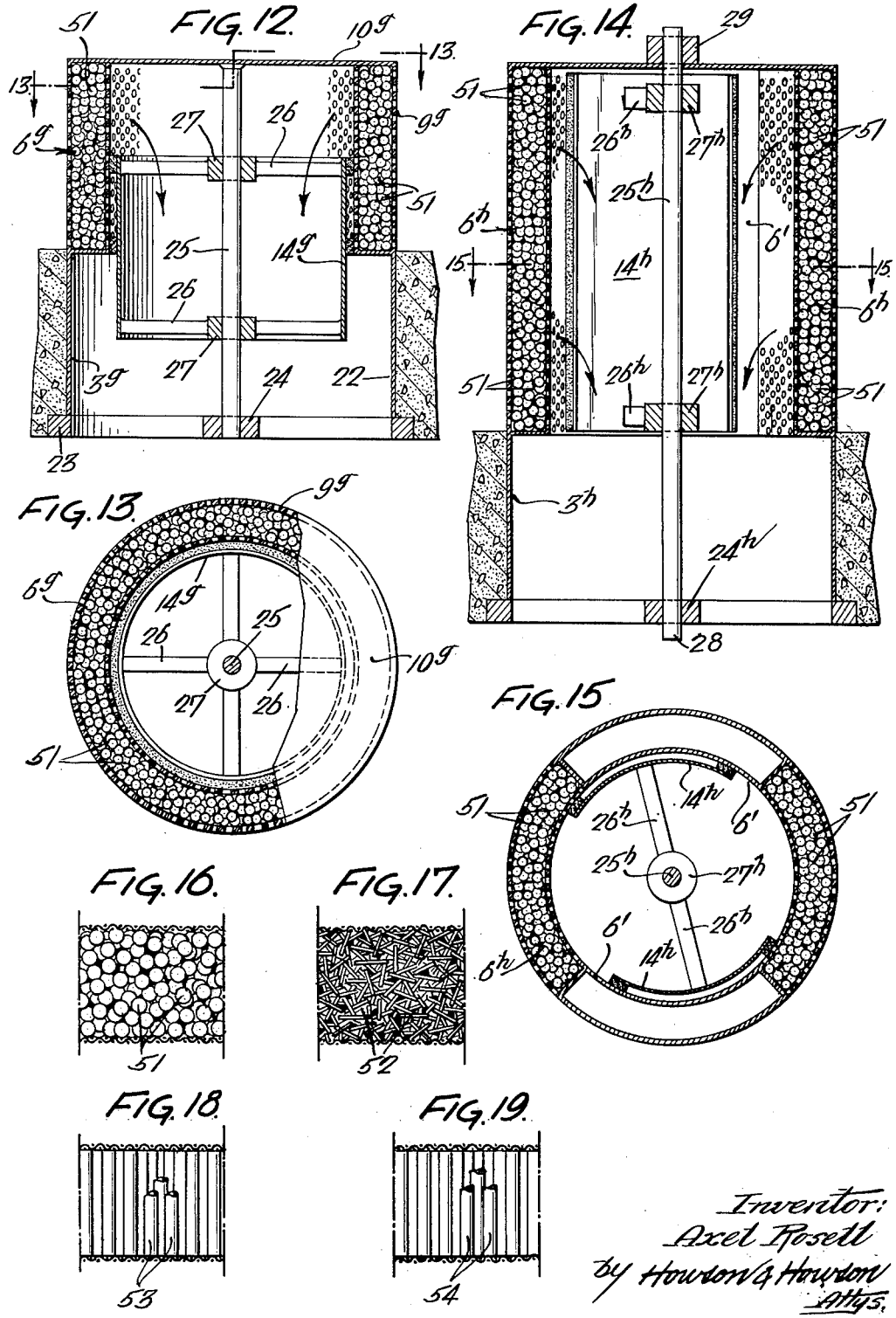

United States Patent Office 3,042,078
Patented July 3, 1962

3,042,078
VOLUME FLOW REGULATING DEVICE
Axel Rosell, Stockholm, Sweden, assignor to Aktiebolaget Svenska Flaktfabriken, Stockholm, Sweden
Filed Mar. 6, 1959, Ser. No. 797,706
Claims priority, application Sweden Mar. 7, 1958
7 Claims. (Cl. 137—625.3)

In regulating the volume flow of ventilating air in a traditional manner by means of throttling dampers in a channel, an opening or the like, the flow passage is throttled more or less as the need may be. However, the air passes through the remaining free area of the passage without any hindrance or obstruction. Such throttling is based upon an equilibrium state between the pressure difference of the air on different sides of the damper and the pressure losses of the air in the vicinity of the damper, ahead, through and behind the same, which losses substantially correspond to the maximum dynamic pressure of the air passing the damper.

For a good regulating effect it is fundamental that substantially all of the kinetic energy of the air leaving the damper is converted into flow losses. The smaller the reduction in air velocity after the damper, the worse is the regulating effect of the damper. Where the reduction of velocity is accompanied by flow losses, the main part of the kinetic energy of the air will be transformed into heat energy. A minor part will be transformed into sound energy. Even if the energy quantities in the form of sound are very small, the resulting noise will be disturbing. As an example, the air velocity must be of a magnitude of 6 m./sec. in order to produce a pressure drop of 2 mm. water gauge which is a very small value. An air velocity of 6 m./sec. can, however, cause disturbing noise. For uniform air distribution which is independent of occurring pressure variations in rooms and air ducts, the pressure drop in a regulating damper should be considerably greater than 2 mm. water gauge, which however involves great difficulties owing to disturbing noise. Also the regulating characteristic of the damper will be improved with an increased pressure drop across the damper, but the noise problem will be more difficult to overcome when the pressure drop is greater.

This problem will be eliminated by means of a regulating device made in accordance with the invention. There will be no noise problem, even with pressures as high as 10 mm. water gauge or more and the regulating device may readily be given a desired regulating characteristic which is regulatable within wide limits.

The invention is mainly characterized by an air permeable flow resisting body arranged in the passage for said medium and entirely covering the flow area and a slidable damper means arranged at the inlet side and/or the outlet side of said medium in air-tight alignment with said body, the free flow passage area being increased or decreased by the adjustment of said damper means. The flow resisting body has a structure causing a flow resistance which is substantially constituted by friction losses and is of a magnitude considerably greater than the dynamic pressure for the corresponding volume flow in the passage.

The invention will now be described more in detail with reference to the accompanying drawings showing different exemplifying embodiments of the invention and in which:

FIG. 5 shows in vertical section a regulating device with a chain as maneuvering means.

FIG. 6 is a horizontal section of the device taken on the line 6—6 of FIG. 5.

FIG. 7 shows a modified embodiment of the device in FIG. 5 having a flow characteristic according to the curve III in FIG. 2.

FIGS. 8 and 9 illustrate in an end view and section respectively a regulating device with a flow resisting body in the form of a circular plate.

FIGS. 10 and 11 show in end view and section a modified regulator similar to that of FIG. 8.

FIGS. 12–15 show in longitudinal and transverse cross section respectively two different designs of the regulating device with a flow resisting body in form of a hollow cylinder (FIGS. 12 and 13) and in form of sectors of such a cylinder (FIGS. 14 and 15) respectively, and FIGS. 16–19 show various forms of flow-resisting material which may be employed in apparatus of the present invention.

Figure 1:
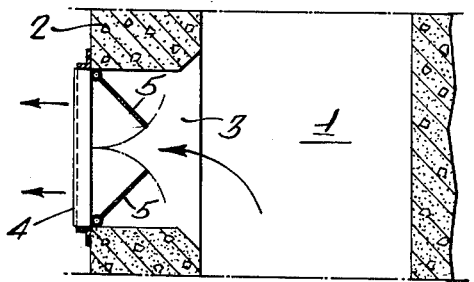
FIG. 1 shows in vertical section an air supply register with a regulating damper of conventional design.

Regulating devices in accordance with the invention can be used in connection with the supply as well as the exhaustion of ventilating air. This is also the case for the exemplifying embodiments shown in the drawings, regardless of the flow direction marked with arrows.

In FIG. 1, an air supply shaft or duct 1 is separated from a room by means of a wall 2. In this wall there is a passage 3 for the supply of air as illustrated by arrows. The passage 3 which in the present case is short in the flow direction of the air may in other cases consist of a branch of great length of a duct system. The passage 3 will in the following description be referred to as a "channel." At the end of the channel facing the room there is arranged a supply register 4 with a front grill in form of guiding vanes or the like and behind the grill there are two damper blades 5 for the regulation of the passing air volume flow.

Figure 2:
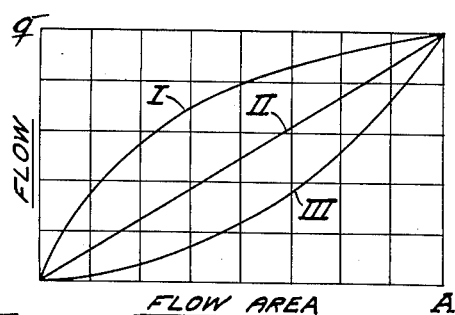
FIG. 2 is a diagram illustrating different regulating characteristics of dampers.

When using a supply register of this kind a characteristic for the volume flow $q$ as a function of the free flow passage area A in the register is obtained, which characteristic has the form illustrated by curve I in FIG. 2. With increasing free passage area A the volume flow $q$ rises very rapidly at the beginning and will thereafter increase more and more slowly. This means that for small volume flows the regulating effect of the regulating device is at a minimum, which of course is a great disadvantage. In most cases it is desired to obtain a linear characteristic, i.e. as illustrated by the line II in FIG. 2. This means that the volume flow will increase proportionately to the free passage area. The advantage with such a regulating device is that the volume flow will be indicated directly by the size of the free passage area. In certain cases, especially when using large regulating devices and great pressure differences, it is desirable to have the volume flow at the beginning rise very slowly with increasing free passage area and thereafter increase more and more rapidly. The corresponding characteristic is illustrated by the curve III in FIG. 2.

Figure 3:
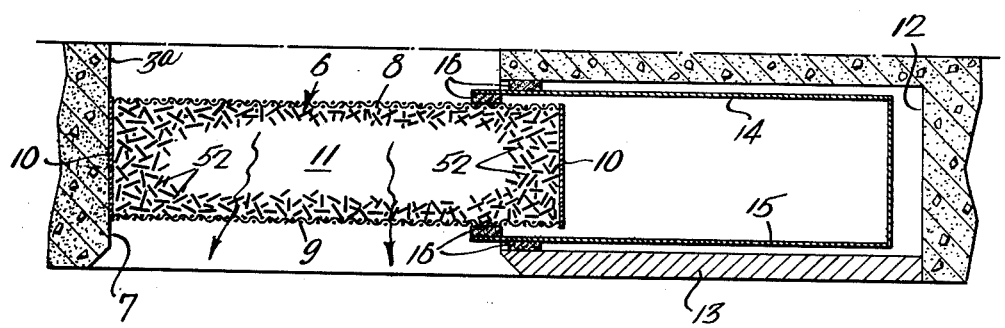
FIGS. 3 and 4 are sections of two regulating devices of somewhat different design explaining the principle of the invention.

According to the embodiment of the invention shown in FIG. 3, a flat body of uniform thickness 6 constituting the flow resisting body is inserted in the channel 3a. Said body is arranged with the plane parallel surfaces substantially perpendicular to the longitudinal direction of channel 3a. The body 6 is placed somewhat behind the opening 7 of the channel. The shape of the body is assumed to be that of a rectangle extending upwards as well as downwards with respect to the plane of the drawing. The body consists of a casing with a rear wall 8 and a front wall 9 and side walls 10. The rear and front walls are perforated, for example in the form of a wire mesh, and enclose flow resisting material 11. For obtaining the intended resistance effect said body can be made in many different ways. The material 11 may for instance consist of a filling of small round balls 51 of glass, porcelain or metal, such as lead shot as shown in FIG. 15. The material may also consist of small short tube stubs 52 of porcelain or the like packed at random within the body as shown in FIG. 17. According to another embodiment said material consists of narrow tubes 53 of glass, porcelain or the like, the length of which is equal to the thickness of said plate and which are arranged close to each other in parallel array as shown in FIG. 18. In this case both the tube channels and the spaces between the tubes constitute flow passages. Instead of tubes, round solid rods 54 can be used as shown in FIG. 19, and in such a case the spaces between the rods constitute the flow passages.

On one side of the body 6 (FIG. 3) there is a recess 12, the front side of which is covered by a plate 13, whereby a cavity is formed. In this cavity a U-shaped hood 14—15 is slidably arranged. The hood is dimensioned to telescopically engage the body 6. For sealing purpose there are arranged sealing elements 16 at the edges of the hood and the cavity. The elements for sealing against the side walls 10 are not illustrated in FIG. 3. The more the hood 14—15 is displaced to the left, the more it will cover the body 6 and the less free passage area for the air will remain. The volume flow of the air passing through the body of the regulating device, at a certain pressure difference between the different sides of the body will be substantially proportional to the free passage area of the body, i.e. to the area not covered by the hood 14—15. If the material 11 is homogeneous, i.e. if it has the same flow resistance in all directions, the air at the edge of the hood will flow along a curved line to the right. This "leaking flow" will increase as more of the body is covered by the hood. This flow will distort the characteristic shown as a linear curve II (FIG. 2) to deviate towards the curve I, but this is as a rule of no practical importance as long as the deviation is small.

Figure 4:
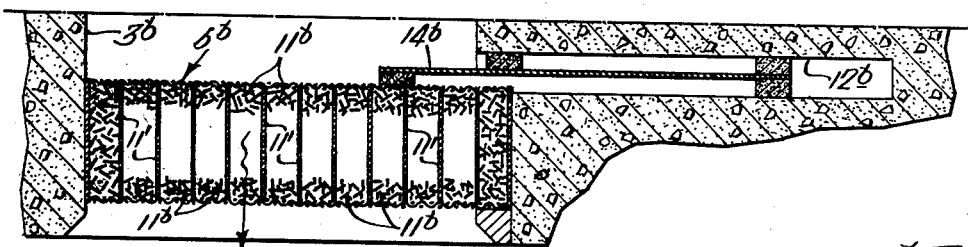

The leaking flow can, however, be entirely eliminated if the inserted material consists of a plurality of tubes or rods arranged close to each other and perpendicularly to the surfaces 8 and 9. Such material will not allow any lateral flow. Even when using a homogeneous body the leaking flow can substantially be eliminated for instance by means of partitioning walls 11' as illustrated in FIG. 4. In such a case there is no need to cover the body 6b on two opposite sides. It is sufficient to cover one side of the plate. As illustrated in FIG. 4, the cavity 12b is narrow and only contains a covering shield 14b corresponding to the side wall 14 of the hood in FIG. 3. By moving the shield 14b to the left or the right a smaller or greater volume flow through the channel 3b will be obtained in the same manner as disclosed in FIG. 3. The material 11b between the partitions 11' may be of any desired form which provides a flow resistance caused by friction losses.

For operating the covering means, be it a hood, a shield or the like, many different means can be used. FIGS. 5 and 6 show an embodiment with a pulling chain and is self-explanatory. The essential elements are the same as those disclosed in the drawing figures described above. The shield 14c is vertically movable and guided by means of guiding rails 17 in the slot 12c (FIG. 6). The shield can be moved upwards, towards a covering position by means of a spring 18. At the bottom of the shield a ball chain 19 is fastened, which chain passes the wall 2c through a pipe 20. The ball chain is especially suitable as it prevents any undesirable air leakage flow through the pipe 20. By means of the chain 19 the shield 14c is pulled downwards against the action of the spring 18. Hereby a greater or smaller part of the body 6a can be uncovered and the volume flow through the channel 3c can be adjusted to greater or smaller values.

For the locking of the chain 19 in a certain position a fitting 19c can be arranged on the wall. In using regulating devices with a single pulling chain it is suitable to have the device constructed as stated above so that the device is opened by pulling the chain. If the device is constructed to be closed by pulling the chain, there is a greater risk that the device will be left by an operator in an open position even when no air supply is desired. The device may be constructed to be operated by means of two chains one for its opening and one for its closing. Of course, other suitable operating means can be used.

FIG. 7 shows a modification of the devices described above. The body 6d is composed of material 11d whose thickness decreases downwardly as shown. The outer wall 9d inclines inwardly. The consequence of this will be that the flow resistance of the body 6d will decrease from the top to the bottom. The quantity of air flowing through the channel 3d will increase progressively in the same degree as the surface is uncovered, resulting in that a characteristic of the shape of curve III in FIG. 2 will be obtained. In front of the slanting side 9d there is suitably placed a vertical perforated wall 9'.

FIGS. 8 and 9 show an embodiment with a circular regulating device. The channel 3e has circular cross section, in which there is arranged a body 6e in form of a circular disc surrounded by a sealing ring 16e. Within the cavity 12e, which can be formed by a semicircular stationary shield 13a, there is a second semicircular shield 14e rotatably mounted on a center shaft 21. By turning the shield 14e about the shaft 21 a greater or smaller part of the free semicircular surface of the inserted body 6e will be uncovered and thus the flow in the passage 3e will be regulated. For turning of the shaft 21 it may be connected with two pulling chains or any other suitable operating means. The circular surface can be divided in another manner than in two semi-circular parts. Said surface can be divided in quadrants or in sectors having a small center angle. The shield 14e can be composed of a number of sectors slidable one within another, whereby in the open position only a small part of the disc surface is to be covered. A shielding means in form of an iris diaphragm may also be used.

It is not necessary that the covering and the uncovering respectively of the surface of the flow resisting body is carried out by means of a shield or the like which is displaceable along the surface. Instead of this the surface can be covered or uncovered by a sealing member, displaceable from the surface stepwise or continuously. In the embodiment shown in FIGS. 10 and 11 it is thus possible to use a slitted plate 14f constituting a continuous spiral for the covering of the circular surface of the body 6f, which spiral in its resting position presses against the surface and covers the same. By pulling the spiral outwards from the surface it is possible to uncover the surface more or less. The spiral may suitably be so formed that, when pulling the spiral, the center of same will first be brought outwards and thereafter an increasing length of the spiral will successively be brought outwards thereby increasing the flow through the channel 3f. Of course, other sealing members may be used which are displaceable away from the resistance body to sequentially increase or decrease the flow area therethrough.

FIGS. 12 and 13 show in length and cross sections respectively a regulating device with a cylinder-shaped flow resisting body 6g having a closed end 10g. The shield 14g has the shape of a cylinder. The outer wall 9g of the casing for the flow resisting body is extended to form a mounting lining 22 fastened to a frontal ring 23. A center hub 24 of this ring supports a shaft 25 projecting through the regulating device to its rear wall 10g. This shaft 25 constitutes a guiding means for the shield 14g, which is supported by means of arms 26 and hubs 27 slidable along said shaft. This means that also the shield 14g is displaceable along the shaft 25 for regulating the volume flow through the channel 3g. The cylindrical shield is displaced inwardly of the air supply channel 3g for decreasing the volume flow and outwardly for increasing same. If the regulating device according to FIGS. 12 and 13 is intended to be a pre-set device, the shield 14g with arms and hubs may be fixed in a certain position of the shaft 25 by means of a locking screw or the like (not shown). If the device is intended for frequently repeated adjustments, the shield 14g may be connected to operating chains or to any other suitable operating means for the inward and outward displacement.

The embodiment according to FIGS. 14 and 15 differs from the earlier described embodiments in that the shield 14h for the regulation is turnably arranged around the central shaft 25h. The flow resisting body is divided into two cylindrical sectors 6h separated from each other by means of two non-permeable intermediate sectors 6'. The shield 14h is suitably rigidly joined with the shaft 25h by means of the arms 25h and the hubs 27h and the shaft is rotatably journalled in the center hub 24h of the ring and in a bushing 29 at the rear side of the device. By turning the shaft together with the shield a variation of the size of the surfaces being passed by the air is obtained and thus the volume flow through the channel 3h is regulated. The number of cylindrical sectors can be one, two, or more.

The thickness of the flow resisting body in the flow direction of the air can be varied to suit the desired pressure drop and the flow resistance of the body per unit of length in the flow direction. It is preferred to design the device so that the flow resisting body or bodies can easily be removed, inserted or exchanged.

For the adjustment of the characteristic of the regulating device the flow resisting body can be made with a varying flow resistance across the surface in many different manners. It has earlier been described that the thickness can be varied linearly or in accordance with a certain curve. For a predetermined constant thickness of the flow resisting body the resistance can be varied across the surface by a variation of the properties and composition of the inserted material either linearly or in accordance with a certain curve. The regulating device in accordance with FIGS. 14 and 15 has as regulating means the advantage from the view of operating that the adjustment readily can be carried out by means of a knob, an arm, a chain or the like. For this purpose only the end 28 of the shaft 25h must be provided with the operating means. For one and the same flow passage area and flow resisting body, however, the regulating device according to FIG. 14 must be longer than that according to FIG. 12 as only a part of the mantle surface is air-permeable in the embodiment according to FIG. 14.

Regulating devices according to the invention can be used in connection with ventilating systems of substantially any type, working with pressure and pressure differences of quite different values. At the lower limit with respect to the fields of use are ventilating systems with self-draft, so called "natural ventilation" in which the pressure differences often are of the order of 1 mm. water gauge. However, in ventilating systems, working with essentially higher pressure and pressure differences, the regulating device provides its greatest advantages as compared with devices of traditional designs.

What I claim is:

1. A device for regulating the volume flow of a gaseous medium through an opening, as of an air duct, comprising in combination, a flow-resisting medium-permeable body entirely covering the flow area of said opening, and shiftable damper means movable for adjustment independently of the action of the medium thereon, sealingly and variably engaging at least one face of said body transversely of the line of flow of the medium through the body, said flow-resisting body comprising elements which divide the flowing medium into a multiplicity of passageways aligned with the direction of flow of said medium through the opening, and said elements being of such size and character as to impose frictional flow resistance of substantially greater magnitude than the dynamic pressure for the corresponding volume flow of the medium through the opening.

2. A device for regulating the volume flow of a gaseous medium through an opening, as of an air duct, comprising in combination, a flow-resisting medium-permeable body entirely covering the flow area of said opening, and shiftable damper means movable for adjustment independently of the action of the medium thereon, sealingly and variably engaging at least one face of said body transversely of the line of flow of the medium through the body, said flow-resisting body comprising elements which divide the flowing medium into a multiplicity of passageways aligned with the direction of flow of said medium through the opening, and said elements being of such size and character as to impose frictional flow resistance of substantially greater magnitude than the dynamic pressure for the corresponding volume flow of the medium through the opening, said body of flow-resisting elements being closely covered on at least one side by a perforated sheet of material arranged transversely of the line of flow of said medium, and said damper means closely engaging the surface of said sheet.

3. A device for regulating the volume flow of a gaseous medium through an opening, as of an air duct, comprising in combination, a flow-resisting medium-permeable body entirely covering the flow area of said opening, and shiftable damper means movable for adjustment independently of the action of the medium thereon, sealingly and variably engaging at least one face of said body transversely of the line of flow of the medium through the body, said flow-resisting body comprising elements which divide the flowing medium into a multiplicity of passageways aligned with the direction of flow of said medium through the opening, and said elements being of such size and character as to impose frictional flow resistance of substantially greater magnitude than the dynamic pressure for the corresponding volume flow of the medium through the opening, said body of flow-resisting elements being closely covered on both sides by perforated sheets of material arranged transversely of the line of flow of said medium, and said damper means closely engaging the surfaces of both of said sheets.

4. A device for regulating the volume flow of a gaseous medium through an opening, as of an air duct, comprising in combination, a flow-resisting medium-permeable body entirely covering the flow area of said opening, and shiftable damper means movable for adjustment independently of the action of the medium thereon, sealingly and variably engaging at least one face of said body transversely of the line of flow of the medium through the body, said flow-resisting body comprising elements which divide the flowing medium into a multiplicity of passageways aligned with the direction of flow of said medium through the opening, and said elements being of such size and character as to impose frictional flow resistance of substantially greater magnitude than the dynamic pressure for the corresponding volume flow of the medium through the opening, said body of flow-resisting elements being closely covered on both sides by perforated sheets of material arranged transversely of the line of flow of said medium, and said damper means closely engaging the surfaces of both of said sheets over the same portions but on opposite sides in all adjusted positions.

5. A device for regulating the volume flow of a gaseous medium through an opening, as of an air duct, comprising in combination, a flow-resisting medium-permeable body entirely covering the flow area of said opening, and shiftable damper means movable for adjustment independently of the action of the medium thereon, sealingly and variably engaging at least one face of said body transversely of the line of flow of the medium through the body, said flow-resisting body comprising elements which divide the flowing medium into a multiplicity of passageways aligned with the direction of flow of said medium through the opening, and said elements being of such size and character as to impose frictional flow resistance of substantially greater magnitude than the dynamic pressure for the corresponding volume flow of the medium through the opening, said flow-resisting body being divided into channels by non-permeable walls parallel to the direction of flow of said medium.

6. A device for regulating the volume flow of a gaseous medium through an opening, as of an air duct, comprising in combination, a flow-resisting medium-permeable body entirely covering the flow area of said opening, and shiftable damper means movable for adjustment independently of the action of the medium thereon, sealingly and variably engaging at least one face of said body transversely of the line of flow of the medium through the body, said flow-resisting body comprising elements which divide the flowing medium into a multiplicity of passageways aligned with the direction of flow of said medium through the opening, and said elements being of such size and character as to impose frictional flow resistance of substantially greater magnitude than the dynamic pressure for the corresponding volume flow of the medium through the opening, said flow-resisting body being divided into channels by elongated rod-like bodies extending parallel to the direction of flow of said medium.

7. A device for regulating the volume flow of a gaseous medium through an opening, as of an air duct, comprising in combination, a flow-resisting medium-permeable body entirely covering the flow area of said opening, and shiftable damper means movable for adjustment independently of the action of the medium thereon, sealingly and variably engaging at least one face of said body transversely of the line of flow of the medium through the body, said flow-resisting body comprising elements which divide the flowing medium into a multiplicity of passageways aligned with the direction of flow of said medium through the opening, and said elements being of such size and character as to impose frictional flow resistance of substantially greater magnitude than the dynamic pressure for the corresponding volume flow of the medium through the opening, said flow resisting body being divided into channels by spaced partition plates extending parallel to the direction of flow of said medium and having end edges parallel to the forward edge of said damper means as it moves over the surface of said body.

References Cited in the file of this patent
UNITED STATES PATENTS

| | | |
|---|---|---|
| 707,318 | Geyer et al. | Aug. 19, 1902 |
| 1,377,883 | Grosvoldi | May 10, 1921 |
| 1,548,288 | Smith | Aug. 4, 1925 |
| 2,118,271 | Slayter | May 24, 1938 |
| 2,196,828 | Hess | April 9, 1940 |
| 2,296,635 | Foehrenbach | Sept. 22, 1942 |
| 2,340,389 | Janosky | Feb. 1, 1944 |
| 2,890,716 | Werder | June 16, 1956 |